Feb. 22, 1966    H. E. DAHLKE ETAL    3,236,098
ULTRASONIC MEASURING DEVICE

Filed Feb. 29, 1960    9 Sheets-Sheet 1

INVENTORS: WALTER WELKOWITZ
HUGO E. DAHLKE

BY
Cyrus D. Samuelson
ATTORNEY

Feb. 22, 1966     H. E. DAHLKE ETAL     3,236,098
ULTRASONIC MEASURING DEVICE
Filed Feb. 29, 1960     9 Sheets-Sheet 5

Fig.9

INVENTORS
WALTER WELKOWITZ
HUGO E. DAHLKE
BY Cyrus D. Samuelson
ATTORNEY

United States Patent Office 3,236,098
Patented Feb. 22, 1966

3,236,098
ULTRASONIC MEASURING DEVICE
Hugo E. Dahlke, East Brunswick, and Walter Welkowitz, Nixon, N.J., assignors to Gulton Industries, Inc., Metuchen, N.J., a corporation of New Jersey
Filed Feb. 29, 1960, Ser. No. 11,814
4 Claims. (Cl. 73—194)

This is a continuation-in-part of our application Serial No. 707,744, filed January 8, 1958, now Patent No. 3,178,940.

This invention relates in general to ultrasonic measuring techniques and apparatus, and more particularly, to flowmeters for measuring fluid flow in closed conduits by ultrasonic means.

Many of the older techniques and devices for measuring fluid flow through conduits rely on various types of mechanical and magnetic sensing systems, which include deflecting vanes or other obstructions, interposed in the channel of flow. Devices of this type have the disadvantage that they cause a reduction in the maximum pressure of the flowing fluid thereby rendering the measurement of questionable accuracy because of the presence of the measuring device, and further interfering with the operation of the system for other purposes. Moreover, another apparent difficulty in such systems is the necessity for having a break or discontinuity in the pipe walls where the testing device is inserted. These disadvantages are overcome by the use of ultrasonic flow measuring techniques and apparatus wherein it is unnecessary to interpose any parts into the channel of flow.

However, problems also arise in ultrasonic flow measuring systems, particularly in certain types of pulse systems which utilize frequency, phase or time differences between transmitted and received pulses as the flow-measuring criteria. In many cases, these differences are, at best, small, and subject to wide variations with temperature and pressure which require compensation. Moreover, many types of ultrasonic flow measuring equipment utilize carrier frequency oscillators, which require careful frequency stabilization to provide measurements of the required accuracy. A further requirement for many applications is that, measurements be made in terms of mass flow rather than in terms of volume flow. In the ultrasonic flow-measuring devices available in the prior art, such compensations and modifications require complex and cumbersome circuitry.

It is accordingly, an important object of the present invention to provide simplifications and improvements in ultrasonic measuring techniques and devices, thereby rendering the devices more accurate, more compact, and less costly. A further object is to provide a system which is readily adapted for flow measurements, and which is inherently temperature compensated.

Other objects, and the features, uses and advantages of the present invention will be readily apparent from a study of the detailed specification when taken in connection with the accompanying drawings in which:

FIGURES 8 and 9 together constitute the schematic diagram of the transmitter of FIGURE 6, the figures being connected at the points marked R, S and T on both of them;

FIGURE 12 is a block layout diagram showing the relationship between FIGURES 13 and 14; and FIGURES 13 and 14 together constitute the schematic diagram of the integrator and doubler and amplifier of FIGURE 6, the figures being connected at the points marked M and N on both of them.

The flow-measuring device of the present invention is designed to operate in accordance with the following principle. An ultrasonic transducer positioned on the outer surface of the pipe section through which the flow is to be measured is periodically shocked into resonant thickness-vibration by a pulse transmitter which produces a pulsed carrier frequency thereby producing a series of ultrasonic pulses at the resonant frequency of the transducer. If no fluid is flowing in the pipe section, and the beam pattern of the transmitting transducer is symmetrical about a plane perpendicular to the long axis of the pipe section, the maximum energy portion of the pulsed beam impinges on the far side of the pipe section at a point in the same plane. If fluid is flowing in the pipe, the transmitted pulsed beam is deflected downstream from this position by an angle which is a function of the velocity of the fluid flow in the pipe section and the velocity of sound in the fluid, the flow of which is being measured.

A fraction of the transmitted pulse energy travels through the pipe wall and the fluid to the receiving transducer which is mounted on the outside of the pipe, opposite to the transmitting transducer, and is picked up by a receiving transducer which is tuned to the same resonant frequency as the transmitting transducer.

The remaining part of the transmitted pulse energy is reflected from the pipe wall, and travels back and forth as a first echo, a portion again being reflected as a second echo, and so on, to create higher order echoes. After each reflection, the echo amplitude decreases, the pulse trains substantially disappearing after 20 to 30 reflections, depending on the absorption, refraction, etc. of the system. After the last echo disappears, another transmitter pulse is impressed on the system, and the cycle is repeated.

Hence, the voltage on the receiving transducer consists of a continual chain of pulses, each of which is followed by a number of echoes. These pulses and their echoes are amplified, and rectified, resulting in a negative voltage which is impressed on the grid of a direct-current amplifier.

The system is so calibrated, that under the condition of no-flow, sufficient negative bias is applied to hold the direct-current amplifier at the cut-off point. With increasing flow, the negative bias is reduced, since the number and the amplitude of echoes decreases causing current to flow in the cathode resistor of the direct-current amplifier, producing a cathode voltage which is read on the direct-current read-out meter.

It has been observed that increase or decrease in this voltage is a function of the position of the receiving transducer relative to the transmitting transducer in the direction of fluid flow in the pipe section.

Figure 1:
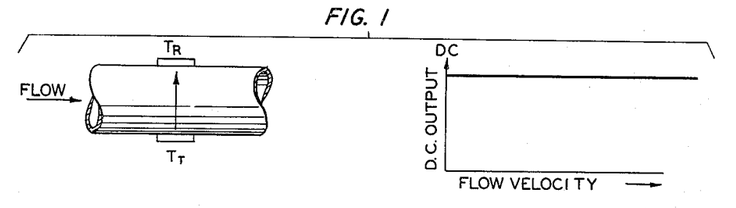
FIGURES 1 and 2 are diagrammatic showings of two different relationships between the transmitting and receiving transducer and the calibration curves in terms of output voltage versus flow rate.

Referring to FIGURE 1 of the drawings, $T_T$ represents the transmitting transducer mounted on the outside of a pipe, and $T_R$ represents the receiving transducer mounted on the opposite side of the pipe. The transmitting transducer generates a directive beam perpendicularly across the pipe, the beam producing under no flow conditions the response pattern shown in FIG. 3 on the opposite side of the pipe. The response pattern has a relatively flat central portion of maximum intensity and relatively steep oppositely sloping portions of progressively decreasing intensity proceeding longitudinally away from the central flat portion of the response pattern. The response pattern is obtained by measuring the amplitude of the output of a receiver transducer probe moved longitudinally along the pipe in the vicinity where the receiver transducer $T_R$ is located under no flow conditions (that is when the velocity of fluid flow is zero). If there is no selective gating of the output of the receiver transducer probe, the useful output of the receiver transducer probe will be the result of both the directly received transmitted beam and echoes which reflect back and forth across the walls of the pipe. Under no flow conditions, the response pattern of FIG. 3 corresponds to the shape of the ultrasonic beam transmitted by the transmitting transducer. Under fluid flow conditions, the transmitted beam and the echoes thereof are deflected in the direction of the fluid flow.

In the case illustrated in FIGURE 1, the receiving transducer is mounted directly opposite the transmitting transducer. The central points of the transmitting and receiving transducers pass through a line extending perpendicularly to the longitudinal axis of the pipe. In FIG. 1 there is illustrated the curve of the amplitude of the signal output of the receiving transducer $T_R$ plotted against the variation in the fluid flow rate (i.e. flow velocity). It is seen that the signal output of the receiving transducer remains relatively flat over the fluid flow rates involved. In such case, it is apparent that the receiving transducer intercepts the relatively flat portion of the response pattern of FIG. 3.

Figure 2:
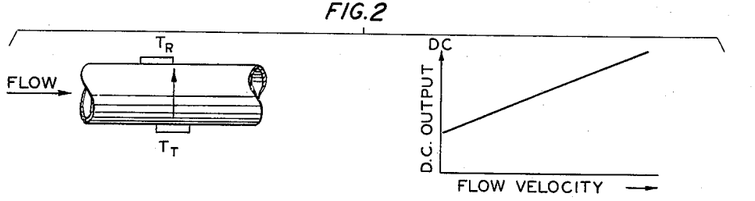

In the case shown in FIGURE 2, the receiving transducer is displaced upstream with respect to the transmitting transducer, a distance of, for example, about ½ inch for a pipe with a three inch inside diameter. In the latter case, it is seen that the signal output varies substantially linearly with changes in flow velocity. It is thus apparent that the receiving transducer is mounted to intercept one of the steep portions of the response pattern shown in FIG. 3.

Figure 3:
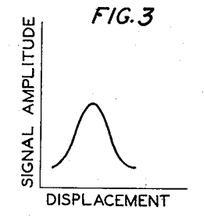
FIGURE 3 is a curve of an ultrasonic energy response pattern resulting from the directive beam of the transmitting transducer in FIGURES 1 and 2 in terms of the relative signal strengths intercepted by a receiver transducer probe positioned at different longitudinally spaced points along the portion of the pipe on which the receiving transducers of FIGURES 1 and 2 are mounted under no flow conditions.
Figure 4:
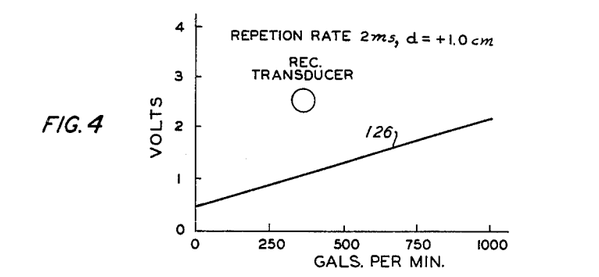
FIGURES 4 and 5 are curves showing the variation in output voltage with fluid flow, utilizing receiving transducers of two different shapes.
Figure 5:
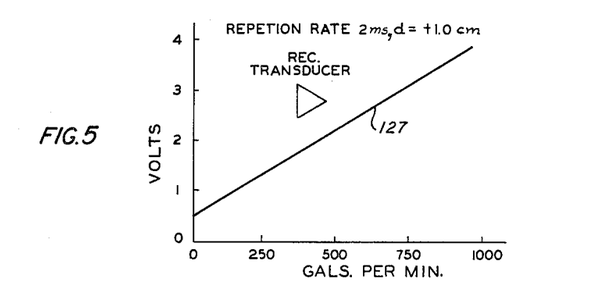
Figure 6:
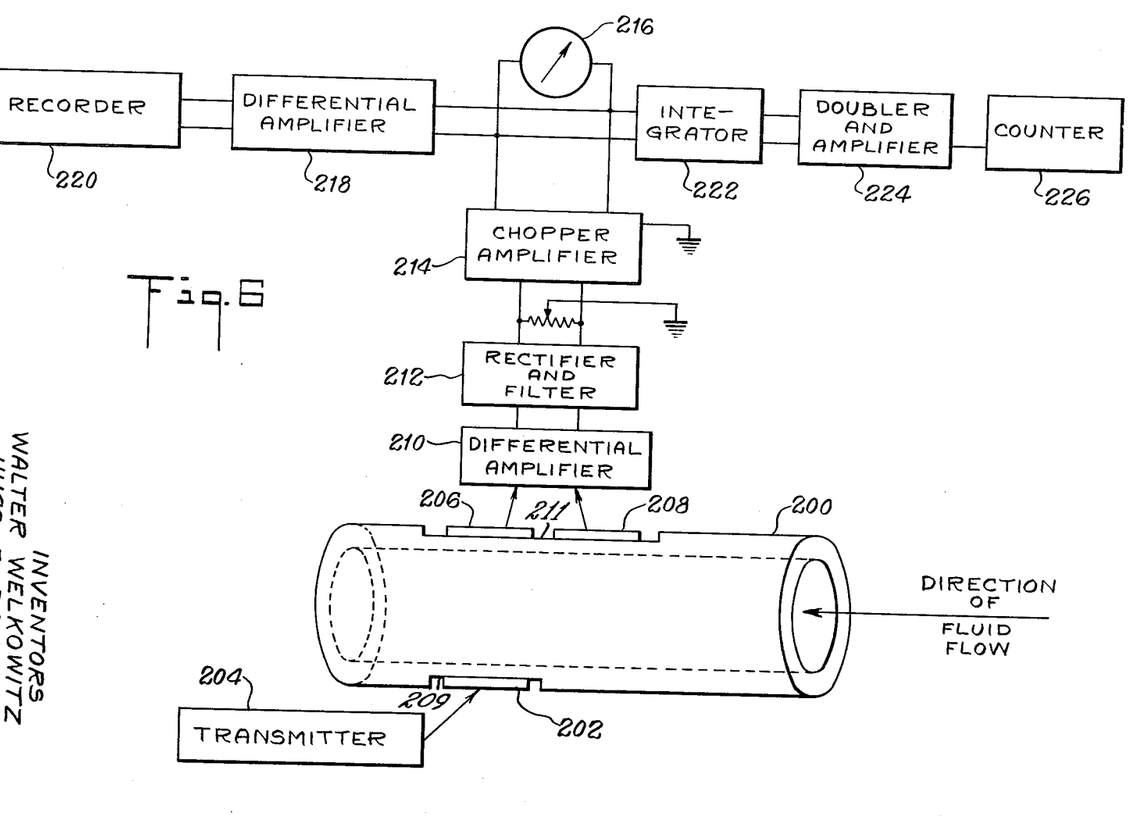
FIGURE 6 is a block diagram of a further embodiment of flowmeter of the present invention utilized for the correction of variations in viscosity and changes in the fluids flowing in the system.
Figures 6, 7:
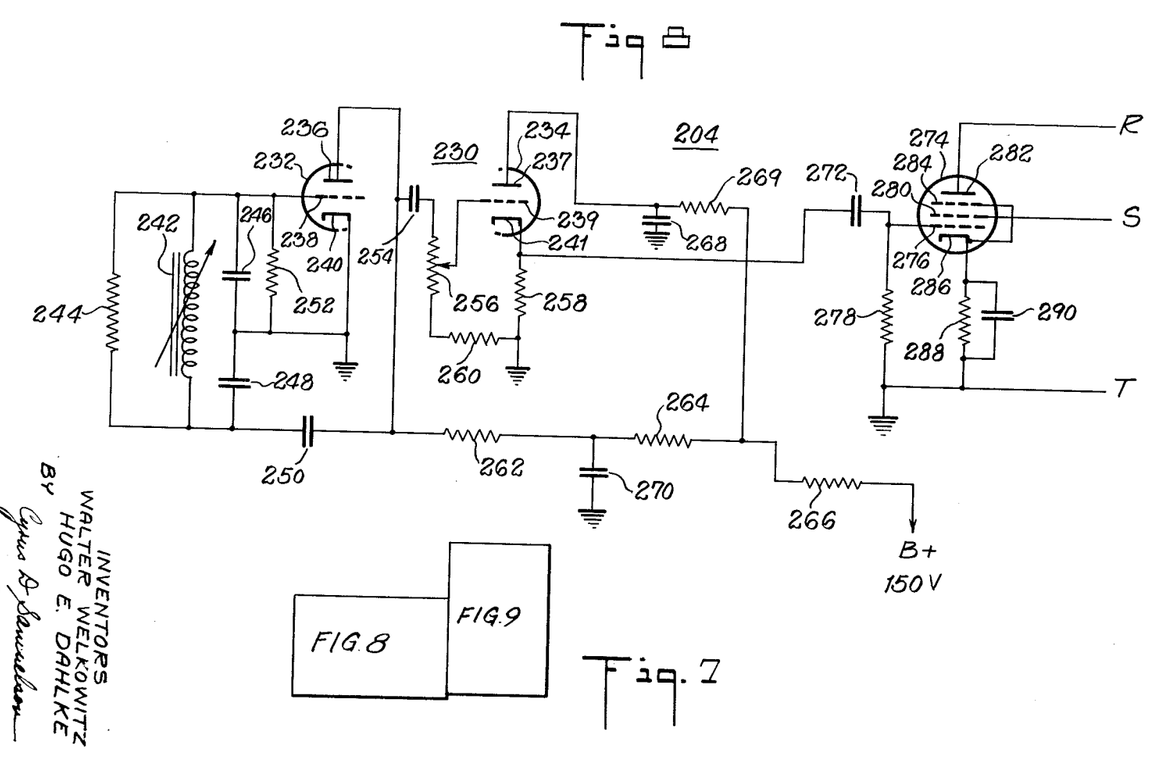
FIGURE 7 is a block layout diagram showing the relationship between FIGURES 8 and 9.

In the embodiment of FIG. 6, two receiving transducers 206 and 208 are placed on the outside of a pipe 200, one opposite the transmitting transducer 202 as shown in FIG. 1 and the other displaced toward the flow origin as shown in FIG. 2. In such case, we thus obtain different output signals from these transducers as a function of the fluid flow rate. The output from the transducer 206 opposite the transmitting transducer is constant with fluid flow (FIGURE 1) and the output from the transducer 208 displaced upstream varies linearly with the flow velocity (FIGURE 3). However, both these receiving transducers are amplitude sensitive and there is a linear relationship between the amplitude of the transmitted pulse and the amplitude of the received echoes on both the receiving transducers. The transducer opposite the transmitting transducer is used for correction and the transducer displaced upstream from the transmitting transducer is used for information.

The transmitting transducer 202 and the receiving transducers 206 and 208 on the opposite side of the pipe, may comprise any of the types of piezoelectric crystalline elements well known in the art, constructed to vibrate in a thickness mode, such as, for example, X-cut quartz, or thin sheet barium titanate ceramic, processed and polarized in the manner set forth in detail in Patent, 2,846,410 issued to Glenn N. Howatt, dated November 1, 1949. In accordance with one form, the transducers are flat wafers about 100 mils thick, and ⅜ inch in diameter, vibrating in a resonant thickness mode of about one megacycle. These are coupled to flat portions 209 and 211 of pipe section 200. In the example under description the latter is about six inches long, and has an inner diameter of three inches, and outer diameter of four inches. The coupling to flats 209 and 211 may be made by means of any satisfactory medium of matching acoustic impedance, such as an epoxy system in which the base resin is combined with a hardener, such as, for example, metaphenylene diamine, and insert mineral fillers. Portions 209 and 211 are machined flat and parallel to within about a mil. The wall thickness is .206 inch, and is uniform over the extent of the portion to which the transducers are attached. This thickness is a half wavelength in the one megacycle frequency of the transducers within a tolerance of about one mil.

Whereas in the embodiments under description, the transmitting and receiving transducers are both round, flat wafers, in alternative embodiments they may be cut in other shapes, each of which produces a different characteristic curve relating output voltage to the rate of fluid flow in the conduit. A practical shape for the receiving transducers has been found to be a flat, triangular wafer, two sides of which are ⅜ inch, and one side, about ½ inch. This is mounted with the ½ inch side parallel to the direction of flow in the conduit.

The following precautions should be observed in installing the flowmeter pipe 200 in a system in which the flow is to be measured.

(1) The flowmeter pipe should preferably be installed in a straight section of pipe so that its distance from an elbow is at least 6 feet. Any decrease in this distance may result in inaccurate readings due to turbulence in the pipe.

(2) The inside diameter of the flowmeter pipe should be aligned with the inside diameter of the feed pipe to avoid turbulence.

(3) The flowmeter pipe 220 should be mounted so that the center line between the transmitter and receiver transducers is approximately horizontal to avoid gas bubbles from assembling on the inside flats of the flowmeter pipe 200.

Transducer 206 is a correction transducer and transducer 208 is an information transducer. Transducer 202 is excited preferably intermittently by transmitter 204 and the outputs of transducers 206 and 208 are applied to the input of receiving differential amplifier 210 in a manner which will be described in detail as this description proceeds.

The output of receiver differential amplifier 210 is fed to the input of rectifier and filter 212, the output of which is then connected to the input of chopper amplifier 214. Three read-out devices are connected in parallel across the output of chopper amplifier 214. They are: meter 216; a voltage recorder; and a magnetic counter. Voltage recorder 220 is a Rustrak recorder manufactured by Rust Industrial Co., Manchester, New Hampshire, and has a full scale sensitivity of approximately one milliampere. Due to the fact that recorder 220 is not sensitive enough to be driven directly from the output of chopper amplifier 214, we have provided read-out differential amplifier 218. The recorder is connected between both plates of the dual triode tube which serves as the differential amplifier.

In order to obtain digital read-out in gallons per unit time, we have provided magnetic counter 226 which is known as a Count-Pak Series 1661 and is manufactured by Veeder Root of Hartford, Connecticut. Counter 226 is fed from integrator 222 and doubler and amplifier 224; the input of integrator being connected across the output of chopper amplifier 214.

The power supply for the system utilizes an electronic voltage regulator with a two stage direct-current amplifier. The change in D.-C. output voltage is ±75 millivolts for a ±10% change in line voltage. The filament voltage is kept constant by a constant voltage transformer and a rotary converter is provided to deliver the input voltage of 115 volts at 60 c.p.s. from a battery source.

Figure 9:
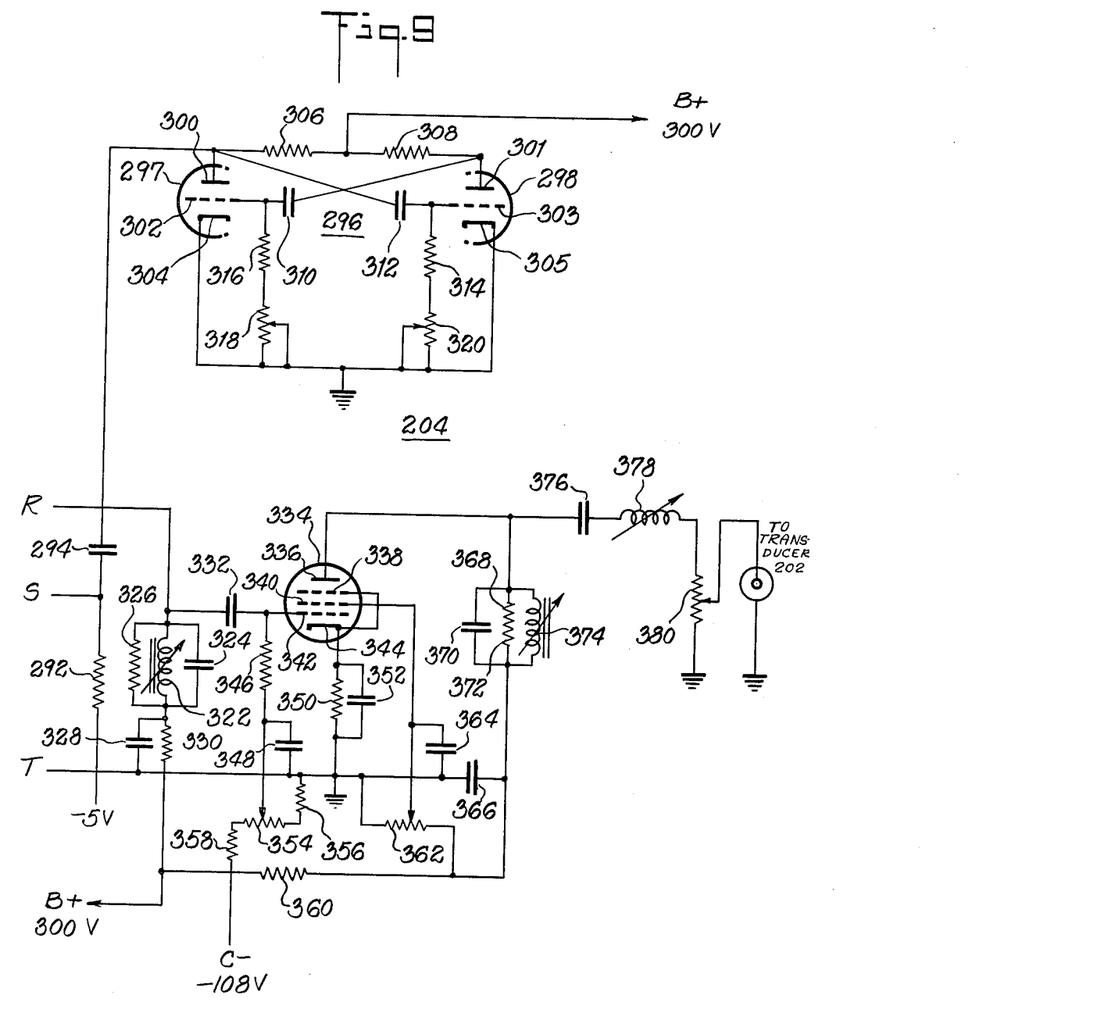

The transmitter 204 delivers 1 mc. pulse having a repetition period of approximately 5 milliseconds and a pulse width of 20 microseconds to transducer 202. With such a period, the amplitude of the echo pulsations for a given transmitted pulse will subside to zero before the transmission of the next pulse. The circuit of a preferred embodiment of transmitter 204 is illustrated in FIGURES 8 and 9. Electron tube 230 is a type 12AV7 having triodes 232 and 234. Triode 232 comprises plate 236, control grid 238 and cathode 240 and triode 234 comprises plate 237, control grid 239 and cathode 241. Triode 232 is connected in a conventional Colpitts circuit having adjustable inductance 242, grid capacitor 246 and plate capacitor 248. Resistor 244 is connected in parallel across inductance 242 to flatten the peak of the resonance curve. Capacitor 250 is the feedback capacitor and resistor 252 is the grid bias resistor for triode 232. We have found that it is advisable for the frequency of the oscillator to be variable for about ±10% of the nominal value. This is accomplished by means of variable inductance 242. By way of example, the following circuit values have been found to be preferable: resistor 244—15,000 ohms; capacitor 246—500 micromicrofarads; capacitor 248—500 micromicrofarads; capacitor 250—250 micromicrofarads; and resistor 252—100,000 ohms. Inductance 242 is a Miller type 4410 coil.

Plate voltage for tube 230 is supplied from the power supply and has the nominal value of 150 volts. It is fed to plate 237 through 10,000 ohm resistor 266 and 8,200 ohm resistor 269. Plate voltage is supplied to plate 236 through resistor 266, 27,000 ohm resistor 264 and 8,200 ohm resistor 262. The output of oscillator 232 is coupled to grid 239 by means of coupling capacitor 254 which has a value of approximately 200 micromicrofarads. The amount of signal applied to grid 239 is controlled by means of variable resistor 256 which has a maximum value of about 25,000 ohms. 10,000 ohm resistor 260 serves to regulate the grid bias of triode 234 in cooperation with variable resistor 256. 4 microfarad capacitor 268 serves as the plate by-pass capacitor for plate 237. The output of triode 234 is taken off cathode 241 (cathode follower) at the cathode end of 6,800 ohm cathode resistor 258. 4 microfarad capacitor 270 serves as a plate supply filter capacitor.

The output of cathode follower 234 is coupled to the grid of buffer amplifier 274 by means of 200 micromicrofarad capacitor 272. Buffer amplifier 274 is a 6BC5 pentode having plate 282, suppressor grid 284, screen grid 280, control grid 276 and cathode 286. 47,000 ohm resistor 278 is the bias resistor for control grid 276 and 150 ohm resistor 288 and 20 microfarad capacitor 290 together constitute the cathode load circuit.

Buffer amplifier 274 is tuned by means of inductance 322 in FIGURE 14 and is cut off when there is no voltage applied to its screen grid 280. The screen grid voltage is supplied from multivibrator 296. Voltage is applied to plate 282 through 10,000 ohm resistor 330 and inductance 322 in parallel with 2,800 ohm resistor 326. Inductance 322 is a Miller type 4410 coil and is in parallel with 150 micromicrofarad capacitor 324 and serves to tune the buffer amplifier to the frequency of the oscillator 232. 12 microfarad capacitor 328 serves as the bypass capacitor for plate 282.

Tube 296 is a 12AV7 having triodes 297 and 298 connected as a free running multivibrator. Plate voltage is supplied from the 300 volt B+ supply as shown in the figure. The multivibrator delivers pulses of variable width and repetition rate in accordance with the settings of resistors 318 and 320 and capacitors 310 and 312. Resistor 318 is a ½ megohm adjustable resistor and resistor 320 is a one megohm adjustable resistor. Triode 297 comprises plate 300, control grid 302 and cathode 304 and triode 298 comprises plate 301, control grid 303 and cathode 305. Plate resistor 306 is about 33,000 ohms and plate resistor 308 is about 82,000 ohms. Feedback capacitor 310 is about 200 micromicrofarads and feedback capacitor 312 is about .002 microfarad. Grid resistor 316 is 18,000 ohms and grid resistor 314 is approximately one megohm. The multivibrator operates in the usual manner and with the foregoing circuit values we have obtained outputs from the multivibrator having the following pulse widths and repetition rates: pulse width 20–60 microseconds; repetition rate 2–6 milliseconds.

The pulse output from the multivibrator is applied to screen grid 280 through .5 microfarad coupling capacitor 294. When positive pulses are applied to the screen grid, buffer amplifier 274 conducts and the signal from the Colpitts oscillator is amplified and applied to the output stage. When no pulses are applied to the screen grid of buffer amplifier 274, it is cut off by a negative voltage of 5 volts connected across 39,000 ohm resistor 330 to screen 280 and no signal from the Colpitts oscillator is applied to the output stage. It can thus be seen that the excitation signal applied to the transmitting transducer consists of pulses having the frequency of the Colpitts oscillator and the width and repetition rate determined by the multivibrator.

The output of the buffer amplifier is fed to control grid 342 of output tube 334 through .01 microfarad coupling capacitor 332. Tube 334 is a 6CL6 and comprises plate 336, suppressor grid 338, screen grid 340, control grid 342 and cathode 344. 100,000 ohm resistor 346 is the grid load resistor and .05 microfarad capacitor 348 is the grid by-pass capacitor. Resistors 354, 356 and 358 serve as the grid bias network and have the following values, respectively: 100,000 ohms, 2,000 ohms and 47,000 ohms. The bias supplied from the —108 volt supply is varied by adjusting resistor 354. 1,000 ohm resistor 350 and 20 microfarad capacitor 352 serve as the cathode load circuit and .05 microfarad capacitor 364 and .1 microfarad capacitor 366 serve as the screen grid and plate by-pass capacitors, respectively.

Plate voltage is applied to plate 366 from the 300 volt supply through 4,700 ohm resistor 360 and inductance 374 in parallel with 8,200 ohm resistor 372. Voltage is applied to screen grid 340 through resistor 360 and 100,000 ohm variable resistor 362 which serves to adjust the amount of screen voltage applied to the screen grid. Output amplifier 334 is tuned by means of variable inductance 374 which is connected in parallel with resistor 372 and 150 micromicrofarad capacitor 370. The tuning circuit is conventional; the resistor being used to flatten the resonance peak. Inductance 374 is a Miller type 4410 coil and the frequency range of the output signal is variable from .950 to 1.1 mc. The output of amplifier 334 is applied to transducer 202 through 200 micromicrofarad capacitor 376 and inductance 378. Inductance 378 serves to tune out the clamped capacitance of transducer 202. This is achieved by adjusting the output to resonance as indicated on an oscilloscope or similar indicator (not shown) which is connected across the transmitting transducer. The transmitter delivers up to 20 volts peak-to-peak when used with an 8″ pipe which corresponds to one hundred milliwatts of peak power across a 1000 ohm impedance. Variable resistor 380 of 50,00 ohms is used for adjusting the amplitude of the output signal.

Figure 10:
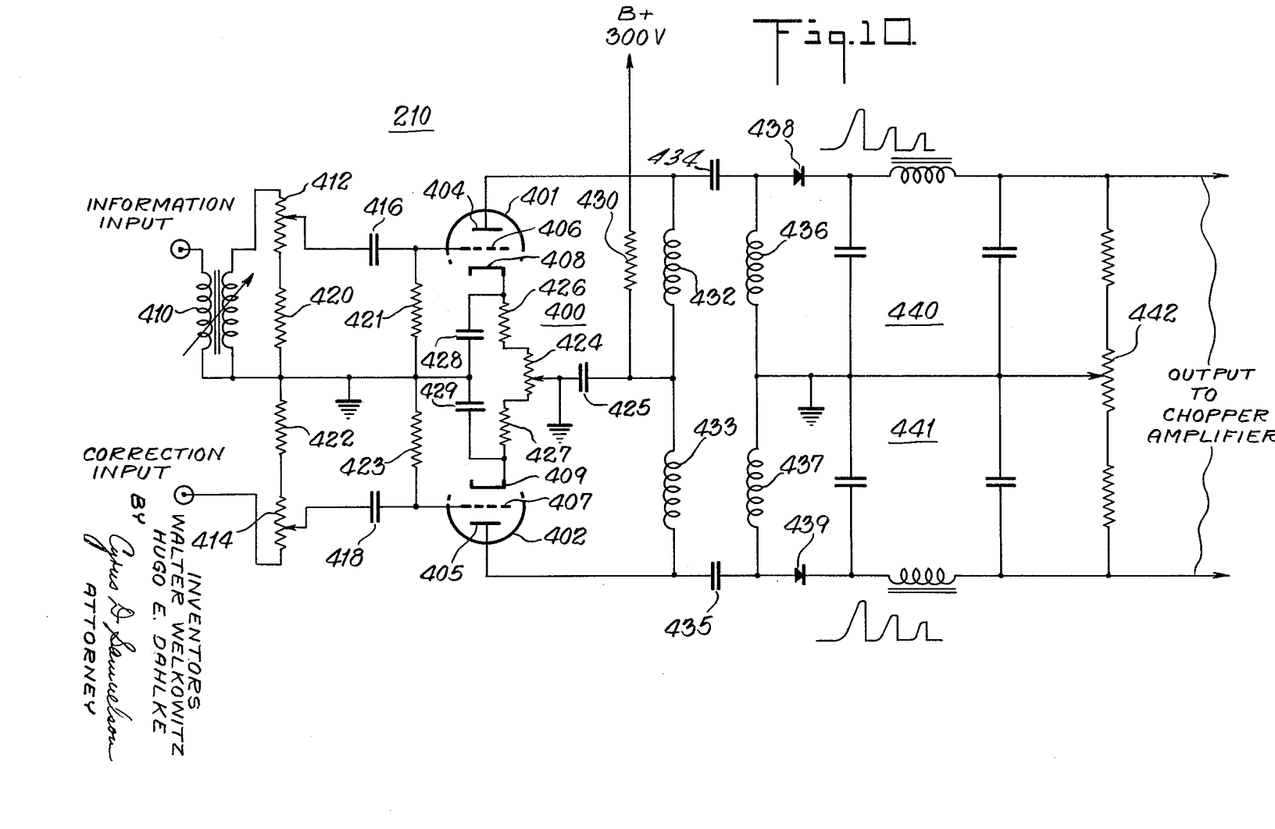
FIGURE 10 is the schematic diagram of the receiver differential amplifier and rectifier and filter of FIGURE 6.
Figure 11:
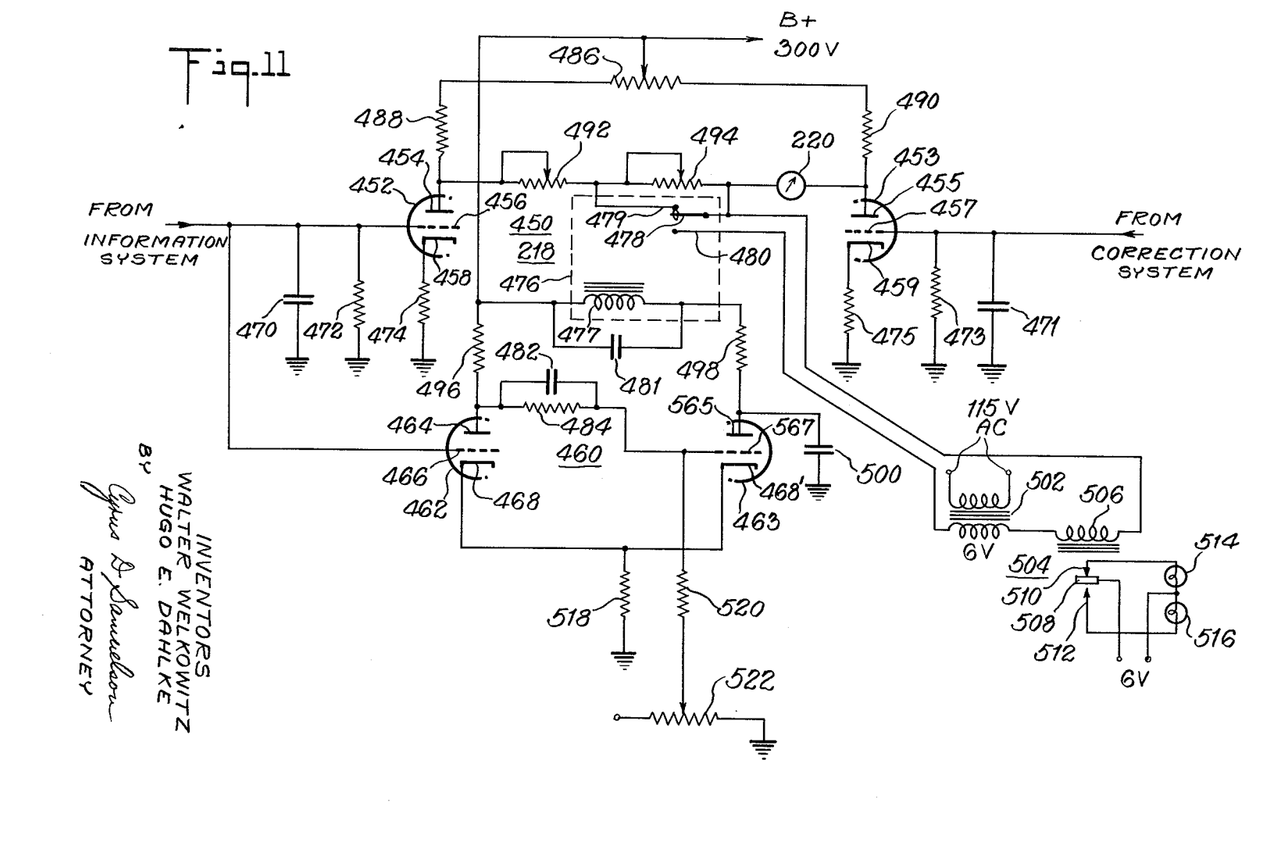
FIGURE 11 is the schematic diagram of the read-out differential amplifier of FIGURE 6.

In FIG. 10 there is illustrated the schematic diagram of receiver differential amplifier 210 and rectifier and filter 212. The output of correction transducer 206 is connected to the "Correction Input" and the output of information transducer 208 is connected to the "Information Input." Tuned grid transformer 410 is provided in the information channel to step up the output of the channel because the output of the information transducer is approximately 25% that of the correction transducer. This is due to the positions of the transducers with respect to the transmitting transducer. Tube 400 is a type 12AT7 having triodes 401 and 402. Triode 401 comprises plate 404, control grid 406 and cathode 408 and triode 402 comprises plate 405, control grid 407 and cathode 409. The signal from information transducer 208 is applied to grid 406 through tuned inductance 410, 5,000 ohm potentiometer 412 and .01 microfarad capacitor 416. The signal from correction transducer 206 is applied to grid 407 through 5,000 ohm potentiometer 414 and .01 microfarad capacitor 418. Potentiometers 412 and 414 are provided to balance the inputs applied to the respective control grids. 470,000 ohm resistor 420 and 100,000 ohm resistor 421 together with capacitor 416 form the grid input network for triode 401 and resistors 422 and 423, of comparable values, together with capacitor 418 perform a similar function for triode 402.

300 ohm resistors 426 and 427 are respectively the cathode resistors for triodes 401 and 402 and 30 microfarad capacitors 428 and 429 are respectively the cathode capacitors for triodes 401 and 402. 300 ohm potentiometer 424 is used to adjust the circuit so that there is equal gain in both triodes.

Plate voltage is supplied to both plates from the 300 volt supply through 15,000 ohm resistor 430 and 5 millihenry chokes 432 and 433. .5 microfarad capacitor 425 serves as a common plate by-pass capacitor. Choke 432, 0.01 microfarad capacitor 434 and 5 millihenry choke 436 serve as a filter for the output of triode 401 and choke 433, capacitor 435 and choke 437 are of comparable values and perform a similar function for the output of triode 402. The output of information amplifier 401 is rectified by type IN38 rectifier 438 and filtered by filter 440 and the output of correction amplifier 402 is rectified by type IN38 rectifier 439 and filtered by filter 441. Potentiometer 442, which has a value of about 2,500 ohms, is provided to balance the direct-current outputs of the information and correction channels and is adjusted so that with no fluid flow the output meter reads zero. The amplitudes of the signals applied to grids 406 and 407 are of the order of 100 millivolts to 10 millivolts peak-to-peak for the first and the tenth echoes. The direct-current outputs of each of the channels is of the order of a few millivolts.

The direct current outputs of both channels are amplified in the chopper amplifier 214 which has a differential input and a three stage amplifier with a gain of about 1,000. We use a type 190 amplifier manufactured by Offner Electronics of Chicago, Illinois for the chopper amplifier. The output of the chopper amplifier 214, which is an alternating or pulsing output as is conventional in chopper amplifiers, is fed to the various indicating apparatus 216 shown in FIG. 6.

The circuit shown in FIGURE 16 is provided because recorder 220 does not have sufficient full scale sensitivity to be operated directly from the output of chopper amplifier 214. Recorder 220 in a Rustrak recorder manufactured by Rust Industrial Co., Manchester, New Hampshirt and has an accuracy of ±2% of full scale deflection. Tube 450 is a type 12AV7 and comprises triodes 452 and 453. Triode 452 is the information amplifier and comprises plate 454, control grid 456 and cathode 458. Triode 453 is the correction amplifier and comprises plate 455, control grid 457 and cathode 459. Tube 460 is a type 12AV7 and comprises triodes 462 and 463. Triode 462 comprises plate 464, control grid 466 and cathode 468 and triode 463 comprises plate 465, control grid 467 and cathode 468'. Plate supply for plates 454 and 455 is obtained through 25,000 ohm potentiometer 486 which is adjusted so that the triodes are balanced. 10,000 ohm resistors 488 and 490 are plate voltage resistors for plates 454 and 455, respectively. .01 microfarad capacitor 470 and one megohm resistor 472 are the grid bias source for grid 456 and similarly valued capacitor 471 and resistor 473 perform the same function for grid 457. 1,800 ohm resistors 474 and 475 are cathode resistors for cathodes 458 and 459, respectively.

Potentiometers 492 and 494, which have values of 10,000 ohms and 50,000 ohms, respectively, are provided as multipliers for recorder 220. Potentiometer 494 is shorted out by the action of relay 476 on the low range and is in the circuit on the high range. Relay 476 comprises coil 477, contacts 479 and 480 and movable arm 478. When current flows in relay coil 477, arm 478 is pulled into contact with contact 479 thereby shorting out potentiometer 494 and opening the circuit of the secondary of transformer 502 and relay coil 506 of relay 504. Under these conditions, connection is made between contacts 508 and 510 and pilot light 514 is lit. When no current flows through coil 477, contact is made between contacts 478 and 480 and is broken between contacts 478 and 479. The meter is now on the high range with potentiometer 494 in series with the recorder and the circuit of the secondary of transformer 502 and coil 506 is closed. Current flows in coil 506 and contact is broken between 508 and 510 and made between 508 and 512 so that pilot light 514 goes out and pilot light 516 is lit.

The operation of the Schmitt circuit is as follows:

Its function is the same as that of a relay. When the input signal exceeds a certain predetermined amplitude the output voltage is at one of two levels. When the input signal decreases below this threshold, the output falls to the other level. In this case the Schmitt trigger will change the range of the recorder 220. Suppose the output voltage of the information channel changes from zero to 10 volts when the fluid flow changes from zero to 3000 gallons per minute. From zero to 1500 gallons per minute the recorder will indicate the lower range, that is: full scale will be 1500 gallons per minute. For the higher flow range, the meter indicates zero to 3000 gallons per minute. The switching occurs at 5 volts input; this is adjusted by the bias of tube 463. In the low range, that is, input voltage zero to 5 volts, tube 463 is cut off and 462 is conducting. The plate current of 463 is zero, no current flows through the coil of relay 477. Contacts 478 and 479 are closed and resistor 494 is shorted. At the input voltage of 5.2 volts, tube 463 conducts due to the multivibrator action of the system made up of tubes 462 and 463. The plate current of tube 463 causes the relay 477 to close the contacts 478 and 480. The connection across series resistor 494 is opened and the range of recorder 220 is changed to the high range.

Counter 226 is a complete unit manufactured by Veeder Root of Hartford, Connecticut and contains the necessary transistor circuits, magnetic counter and counter tube. It is fed from the output of doubler and amplifier 224 (FIGURE 6). The magnetic counter displays a digital read-out of total flow in gallons. The conversion from D.-C. output voltage to digital read-out is achieved in two steps: one, conversion of the D.-C. voltage into frequency by means of the integrator; and two, doubling of the frequency and amplifying it in the doubler and amplifier. This amplified, doubled frequency is counted in the counter.

Figures 12, 13:
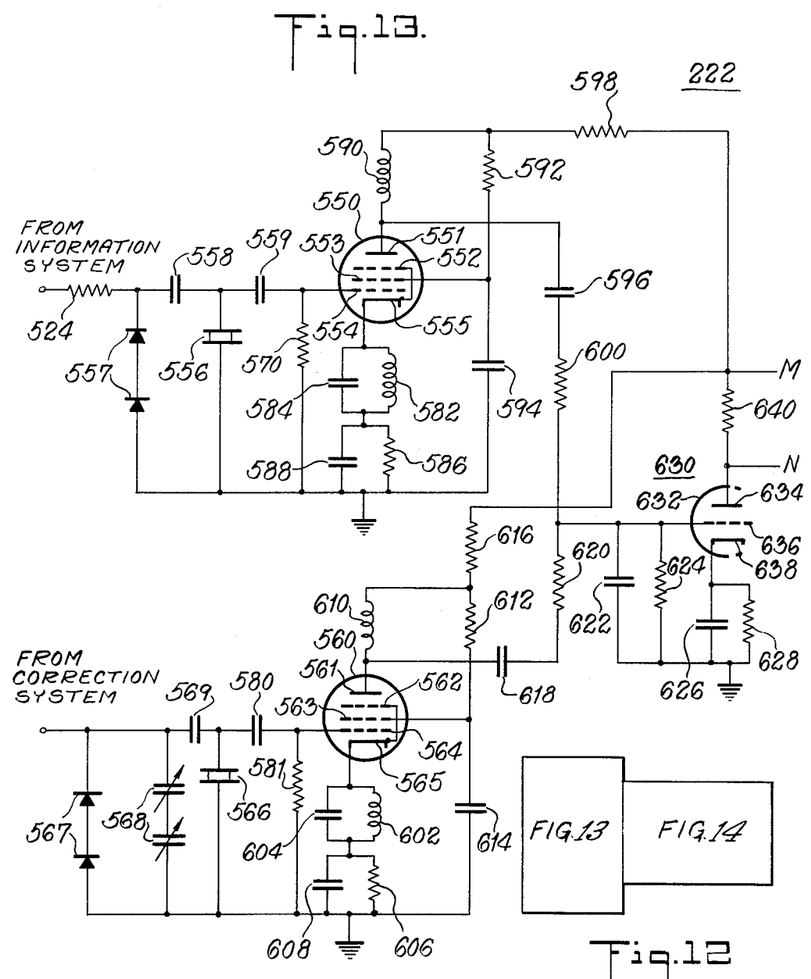

FIGURES 13 and 14 illustrate integrator 222 and frequency doubler and amplifier 224. The integrator comprises two crystal oscillators 550 and 560; oscillator 550 is for the information channel and oscillator 560 is for the correction channel. The frequency of oscillator 550 is controlled by 6 mc. quartz crystal 556 and that of oscillator 560 is controlled by 6 mc. quartz crystal 566. Oscillators 550 and 560 are conventional pentode crystal oscillators except for the silicon diodes 557 and 567 which are connected in parallel across crystals 556 and 566, respectively. It can be seen from the figure that there are two silicon diodes in series across each crystal. In addition, variable capacitors 568 are also connected across crystal 566. Tube 550 is type 6BC5 and comprises plate 551, suppressor grid 552, screen grid 553, control grid 554 and cathode 555. Tube 560 is also a type 6BC5 and comprises plate 561, suppressor grid 562, screen grid 563, control grid 564 and cathode 565.

Information signal is applied to 18,000 ohm resistor 524 and flows through silicon diodes 557. The voltages thus applied to the diodes causes the capacity of the diodes to change and thereby varies the frequency of the oscillator 550 in accordance with the value of the D.-C. voltage applied to the diodes. Correction signal is applied to diodes 567 in a similar manner and the frequency of oscillator is varied in accordance with the value of the D.-C. applied to the diodes. Capacitors 568 which has a value from 3 to 30 micromicrofarads are adjusted so that with no fluid flow the display on the counter is zero.

Grid capacitors 558 and 569 each have a value of 39 micromicrofarads and grid capacitors 559 and 580 each have a value of 100 micromicrofarads. 68,000 ohm resistors 570 and 581 supply grid bias to grids 554 and 564, respectively. 150 ohm cathode resistors 586 and 606 are respectively connected in parallel with .1 microfarad capacitors 588 and 608 and serve to generate a bias voltage for the grid-cathode circuits of the two oscillators. 1 millihenry inductances 582 and 602 are connected in parallel with 100 micromicrofarad capacitors 584 and 604, respectively, and serve as absorption networks for their resonant frequency.

Voltage is applied to plate 551 from the 300 volt supply through 10,000 ohm resistor 598 and 1 millihenry choke 590. Voltage is applied to plate 561 from the same supply through 10,000 ohm resistor 616 and 1 millihenry choke 610. .1 microfarad capacitors 594 and 614 are screen grid by-pass capacitors and 27,000 ohm resistors 592 and 612 are screen grid dropping resistors. The outputs of oscillators 550 and 560 are applied to grid 636 of triode 632 through 100 micromicrofarad capacitors 596 and 618 and 10,000 ohm resistors 600 and 620. Triode 632 is one half of 12AV7 630 and comprises plate 634, control grid 636 and cathode 638. 33,000 ohm resistor 624 and 75 micromicrofarad capacitor 622 supply the grid bias for triode 632, 47,000 ohm resistor 640 is the plate dropping resistor, and 2,200 ohm resistor 628 and .5 microfarad capacitor 626 constitute the cathode load circuit. Triode 632 serves to mix the two signals applied to its grid and to produce an output frequency which is equal to the difference of the frequencies of oscillators 550 and 560.

The output of mixer triode 632 is coupled to the grid of triode 633, connected as a phase inverter, through .25 microfarad capacitor 642. Triode 633 is the other half of tube 630 and comprises plate 635, control grid 637 and cathode 639. Plate voltage is supplied to plate 635 from the 300 volt supply through 500,000 ohm potentiometer 648 and 500,000 ohm resistor 654 is the cathode resistor. 0.001 capacitor 646 and 470,000 ohm resistor 644 form the grid bias circuit for grid 637. Potentiometers 648 and 654 are adjusted so that the outputs therefrom which are applied to bridge rectifier 652 are balanced. Signal is coupled to bridge rectifier 652 through .25 microfarad capacitors 650 and 651. Bridge rectifier 652 comprises a pair of type 6AL5 tubes 655 and 660. Tube 655 comprises diodes 656 and 657 and tube 660 comprises diodes 658 and 659. Bridge rectifier 652 serves as a frequency doubler so that twice the frequency of the signal which is applied to its input is fed from its output.

The output amplifier is a type 12AV7 tube 662 which comprises triodes 663 and 664. Triode 663 is the first stage of amplification and comprises plate 665, control grid 667 and cathode 69. Plate voltage is applied to plate 665 from the 300 volt supply through 10,000 ohm resistor 661 and 220,000 ohm resistor 672. One megohm resistor 680 is the grid resistor. The output of triode 663 is coupled to the grid of triode 664 through .1 microfarad capacitor 674. Triode 664 is the output amplifier and comprises plate 666, control grid 668 and cathode 670. Voltage is supplied to plate 666 from the 300 volt supply through resistor 661 and 270,000 ohm resistor 676 and 4 microfarad capacitor 678 serves as its plate by-pass capacitor. .005 microfarad capacitor 686 and 100,000 ohm resistor 682 constitute the grid bias circuit for grid 668 and 1,000 ohm resistor 684 is the cathode resistor.

The output network is fed from plate 666 and comprises .1 microfarad capacitor 688, 10,000 ohm resistor 690 and 500,000 ohm potentiometer 692. The counter is fed between the variable arm of potentiometer 692 and ground.

The circuit values given by way of example for integrator 222 and doubler and amplifier 224 were selected to produce a maximum flow reading of 3,000 gallons per minute and the operation at that rate takes place as is described below.

A flow of 3,000 gallons per minute is a flow of 50 gallons per second so that for full flow it is necessary to deliver a signal frequency of 50 c.p.s. to the counter. To achieve this it is first necessary to obtain a linear voltage output range from zero to approximately three volts from the crystal oscillators 550 and 560. The slope of the curve of integrator output against input is determined by the value of the input resistor 524. With a value of 18,000 ohms for resistor 524, we have obtained a mixer output frequency of 250 c.p.s. for a three volt input and a zero output frequency for a zero volt input. This 250 c.p.s. signal is frequency doubled in the doubler so that for a three volt input we obtain a 500 c.p.s. output which is applied to the amplifier stage 662. The signal is amplified and shaped in amplifier 662 to produce a train of negative pulses of 20 volt amplitude and a minimum pulse width of 200 microseconds which signal is required to actuate the gas-filled counter tube. The gas counter tube delivers one output pulse for 10 input pulses so that the number of pulses due to a three volt input is decreased from 500 c.p.s. to 50 c.p.s. The 50 c.p.s. signal is applied to the magnetic counter which thereby reads 3,000 gallons per minute. Since the plot of integrator output against input is linear, for lesser flows the frequency of the signal applied to the gas counter tube will be reduced in proportion and the counter will display the true value of flow of the fluid.

Meter 216 is a microammeter with a series resistance for calibration. It can be seen that three methods of displaying the fluid flow give great flexibility to flowmeters of our invention.

While specific structures have been disclosed to illustrate the principles of the present invention, it will be apparent to those skilled in the art that the scope of the present invention is not to be construed as limited to any particular structure or circuit configuration shown herein by way of example.

Having thus described our invention, we claim:

1. An ultrasonic flowmeter of the beam deflection type comprising: a conduit for carrying fluid, ultrasonic transducer means mounted on the outside of said conduit and oriented to direct a directive ultrasonic beam through the conduit walls and substantially perpendicularly across the conduit, said beam producing under no flow conditions in the fluid involved a response pattern along a portion of the conduit which, measured by a receiver probe moved along various points spaced longitudinally of the conduit, has a relatively flat, central, maximum ultrasonic energy intensity portion and relatively steep, oppositely sloping, similar portions of progressively decreasing ultrasonic energy intensity proceeding longitudinally away from the central flat portion of the response pattern, receiving transducers for producing electrical signals having an amplitude which varies with the amount of ultrasonic energy striking the same, said receiving transducers being positioned on the outside of said conduit at said portion of the conduit and spaced from one another along a line substantially perpendicular to the direction of propagation of the beam, one of said receiving transducers being positioned to intercept one of said steep portions of said response pattern wherein the amplitude of the signals produced thereby varies appreciably with variation of the fluid flow rate over the range of fluid flow rates to be measured, and the other receiving transducer being positioned to intercept one of the other portions of said response pattern and means responsive to the amplitude of the signal output of said receiving transducers for providing an indication of fluid flow rate.

2. The ultrasonic flowmeter of claim 1 wherein said other receiving transducer is positioned directly opposite the transmitting transducer wherein the signal output thereof is substantially constant over said range of fluid rates to be measured.

3. The flowmeter system of claim 1 wherein said means responsive to the output of said receiving transducers provides an output proportional to the difference between said receiving transducer signal outputs.

4. The flowmeter system of claim 1 wherein said receiving transducers are mounted on the opposite side of said conduit from said transmitting transducer and are positioned to receive ultrasonic vibrations directly from said transmitting transducer before the same has been reflected by the conduit walls.

References Cited by the Examiner

UNITED STATES PATENTS

| | | | |
|---|---|---|---|
| 2,627,543 | 2/1953 | Obermaier | 73—194 |
| 2,874,568 | 2/1959 | Petermann | 73—194 |
| 2,923,155 | 2/1960 | Welkowitz | 73—194 |
| 2,936,619 | 5/1960 | Gibney | 73—194 |
| 2,959,054 | 11/1960 | Welkowitz | 73—194 |

OTHER REFERENCES

Nondestructive Testing Handbook, McMaster, R.C., editor, Ronald Press Company, New York, 1959, page 43–9.

RICHARD C. QUEISSER, *Primary Examiner.*

ROBERT EVANS, *Examiner.*